United States Patent [19]

Nakamura et al.

[11] Patent Number: 4,841,022

[45] Date of Patent: Jun. 20, 1989

[54] METHOD FOR REMOVING IMPURITIES FROM POLYPHENYLENE SULFIDE RESIN

[75] Inventors: Yoshiaki Nakamura, Chiba; Kiichi Marukawa, Yokohama; Kazuyoshi Nagaki, Chiba, all of Japan

[73] Assignee: Tohpren, Co., Ltd., Japan

[21] Appl. No.: 131,047

[22] PCT Filed: Mar. 24, 1987

[86] PCT No.: PCT/JP87/00179

§ 371 Date: Nov. 13, 1987

§ 102(e) Date: Nov. 13, 1987

[87] PCT Pub. No.: WO87/05915

PCT Pub. Date: Oct. 8, 1987

[51] Int. Cl.$^4$ ............................................. C08G 75/02
[52] U.S. Cl. ...................... 528/487; 528/388; 528/491; 528/492; 528/494; 528/495; 528/496; 528/497
[58] Field of Search ............... 528/487, 491, 492, 494, 528/495, 496, 497, 388

[56] References Cited

FOREIGN PATENT DOCUMENTS 210631 10/1985 Japan .

Primary Examiner—Harold D. Anderson
Attorney, Agent, or Firm—Oliff & Berridge

[57] ABSTRACT

Impurities can be removed from a polyphenylene sulfide resin with a high efficiency by heat-mixing a powdery phenylene sulfide resin with a solvent selected from (I) at least one solvent selected from dimethylsulfoxide, sulfolane, glycerol, ethylene glycol and diethylene glycol, (II) a mixed solvent of a solvent selected from dimethylsulfoxide, sulfolane, glycerol, ethylene glycol and diethylene glycol with an α-halogenated naphthalene or biphenyl, (III) a mixed solvent of the mixed solvent (II) or at least one solvent selected from benzyl alcohol, sulfolane and glycerol with N-methyl-2-pyrrolidone with water to bring the powder and the solvent sufficiently into contact with each other in the partially dissolved state, cooling and filtering the mixture, and washing the filter cake with a solvent incapable of dissolving the polyphenylene sulfide resin therein.

6 Claims, No Drawings

METHOD FOR REMOVING IMPURITIES FROM POLYPHENYLENE SULFIDE RESIN

TECHNICAL FIELD

The present invention relates to a method for removing impurities composed mainly of sodium chloride and other alkali metal compounds from polyphenylene sulfide (hereinafter referred to as "PPS") to obtain PPS having a high purity.

BACKGROUND ART

PPS has excellent characteristics such as a high heat resistance, high dimension stability, and low melt viscosity. However, ordinary PPS contains sodium chloride and other alkali metal compounds resulting from the preparation process as impurities, and therefore, the product does not have a reliable moisture resistance and the use thereof is considerably restricted even though the use of PPS as an encapsulant for IC or LSI is desired.

Various methods for removing impurities such as alkali metal compounds from PPS have been proposed. For example, Japanese Unexamined Patent Publication No. 57-108,135 discloses a method in which PPS is treated with a mixed solvent comprising ethylene glycol and N-methyl-2-pyrrolidone; Japanese Unexamined Patent Publication No. 57-108,136 discloses a method in which a chemical such as sodium carbonate is added to an aqueous slurry of PPS and the mixture is treated at a high temperature under a high pressure; and Japanese Unexamined Patent Publication No. 59-219,331 discloses a method in which PPS is heat-treated in an aromatic solvent such as diphenyl ether, diphenyl, 1-chloronaphthalene, p-chlorophenol or benzonitrile.

In the method where PPS is treated with a mixed solvent of ethylene glycol and N-methyl-2-pyrrolidone, a large quantity of the solvent must be used and the same operation must be repeated at least two times, preferably 3 to 5 times, for removing impurities to a required level. The effect of removing impurities is not sufficient in the method where sodium carbonate is added to an aqueous slurry of PPS and the mixture is treated. Moreover, the method in which PPS is heat-treated in an aromatic solvent such as diphenyl ether or diphenyl has a problem in that, since the melting point of the solvent is relatively high, the treatment must be carried out at a high temperature and separation of the solvent is relatively difficult.

It is an object of the present invention to provide a method for removing impurities such as alkali metal compounds from PPS with a high efficiency.

DISCLOSURE OF THE INVENTION

In accordance with the present invention, there is provided a method for removing impurities from a polyphenylene sulfide resin, which comprises heat-mixing a powdery polyphenylene sulfide resin with a solvent selected from the group consisting of (I) at least one solvent selected from dimethylsulfoxide, sulfolane, glycerol, ethylene glycol, and diethylene glycol, (II) a mixed solvent of a solvent selected from dimethylsulfoxide, sulfolane, glycerol, ethylene glycol, and diethylene glycol with an α-halogenated naphthalene or biphenyl, (III) a mixed solvent of the mixed solvent (II) or at least one solvent selected from benzyl alcohol, sulfolane, and glycerol with N-methyl-2-pyrrolidone and (IV) a mixed solvent of the solvent (I) or N-methyl-2-pyrrolidone with water to bring the powder and the solvent in contact with each other in the partially dissolved state, cooling and filtering the mixture, and washing the filter cake with a solvent incapable of dissolving the polyphenylene sulfide resin therein.

BEST MODE FOR CARRYING OUT THE INVENTION

The PPS referred to in the present invention is a PPS having a particle size in the range of from 5 to 200 $\mu$m and an average particle size of 30 to 50 $\mu$m, which is prepared according to a method as disclosed in Japanese Examined Patent Publication No. 45-3,368 or Japanese Examined Patent Publication No. 52-12,240, and this PPS ordinarily contains 1,000 to 000 ppm of impurities such as alkali metal compounds. The PPS prepared through the ordinary preparation steps is in the powdery form, but in order to increase the contact area, preferably the PPS is finely divided by the dry method or the wet method.

When a mixed solvent is used as the solvent, the mixing ratio is not critical in the case of the solvent (I), but in the case of the mixed solvent (II), that is, a mixed solvent of the solvent (I) with an α-halogenated naphthalene or biphenyl, preferably the mixing ratio by weight of the former solvent to the latter solvent is from 10/90 to 100/0. In the case of the mixed solvent (III), that is, a mixed solvent of the mixed solvent (II) or a solvent selected from benzyl alcohol, sulfolane, and glycerol with N-methyl-2-pyrrolidone, preferably the mixing ratio by weight of the former solvent to the latter solvent is from 10/90 to 90/10. In the case of the mixed solvent (IV), that is, a mixed solvent of the solvent (I) or N-methyl-2-pyrrolidone with water, preferably the mixing ratio by weight of the former solvent to the latter solvent is from 70/30 to 95/5.

It is sufficient if the amount of the solvent is about 1 to about 15 times by weight the amount of PPS. Namely, the solvent is used in an amount such that the concentration of PPS in the slurry is lower than about 50%, preferably 5 to 30% by weight.

The temperature for heating the mixture of PPS and the solvent depends on the kind of PPS and the kind and quantity of the solvent used, but the heating temperature is ordinarily 100° to 270° C., and preferably, 150° to 250° C. If the PPS/solvent mixture is thus heated, PPS is brought to the partially dissolved state, that is, the swollen state.

In the present invention, the PPS is not completely dissolved or molten but is partially dissolved or swollen. Accordingly, the PPS should be in the powdery form, and in view of the efficiency of extraction of impurities, preferably the PPS is as finely divided as possible.

The PPS is maintained in the partially dissolved state for 10 minutes to 10 hours, preferably 10 minutes to 4 hours.

The solvent used in the present invention, such as dimethylsulfoxide, sulfolane, glycerol, ethylene glycol or diethylene glycol, partially dissolves PPS therein at a high temperature and further dissolves sodium chloride and other alkali metal compounds. Accordingly, while the PPS is kept in the partially dissolved state, impurities present in the interior of the PPS, such as sodium chloride, are easily extracted. After the PPS has been maintained in the partially dissolved state for a predetermined time, the mixture is cooled and filtered at an appropriate temperature, for example, 60° to 80° C., and the filter cake is washed with a solvent incapable of dissolving PPS therein. The solvent adhering to the filter cake may be recovered by heating and evaporation prior to this washing, and the filter cake having the solvent adhering thereto may be directly washed. By this washing, the solvent containing the extracted impurities therein is removed.

As the solvent incapable of dissolving PPS therein, there can be used aromatic and aliphatic hydrocarbons such as benzene, toluene, xylene, n-hexane, 2-methylpentane, n-heptane and cyclohexane; esters such as methyl acetate, ethyl acetate and butyl acetate; ketones such as acetone, methyl ethyl ketone and methyl isobutyl ketone; ethers such as diethyl ether, dipropyl ether and di-isopropyl ether; nitrogen compounds such as nitroethane and 1-nitropropane; alcohols such as methanol, ethanol, n-propyl alcohol and isopropyl alcohol; water, and mixtures thereof. Washing can be carried out repeatedly according to need. After washing, the cake is dried, preferably under a reduced pressure.

Ordinarily, impurities can be sufficiently removed to a desired degree by bringing the PPS in the partially dissolved state into contact with the solvent only once. However, if this contact is repeated two times or three times according to need, the impurity content can be further reduced.

The present invention will now be described in detail with reference to the following examples.

Note, all of "%" in the examples are by weight.

EXAMPLES 1 through 4

An autoclave having a capacity of 1 l equipped with a stirrer was charged with 20 g of PPS (100–200 mesh fraction=55%, 200–300 mesh fraction=45%, melting point=285° C., melt viscosity=370 poise at 300° C., $Na_2O$ concentration=1,150 ppm measured by flame photometry after pre-treatment by the sulfuric acid ashing method) obtained by reacting p-dichlorobenzene with sodium sulfide according to the known method and 200 g of dimethylsulfoxide (DMSO) (the PPS concentration in the slurry was about 9%). Elevation of the temperature was initiated simultaneously with stirring, and the temperature was elevated to 160° C., 180° C., 200° C. or 220° C. within 1 hour. The slurry was maintained at this temperature for 4 hours with stirring, and the slurry was cooled with stirring. When the temperature was lowered to 60° to 80° C., the slurry was taken out from the autoclave and filtered under a reduced pressure. The wet cake left after filtration (the volatile component content was about 50%) was washed at 60° C. with 100 ml of acetone. This acetone washing was conducted two times, and the cake was washed two times with 100 ml of deionized water at 90° C. The obtained PPS was allowed to stand in an oven maintained at 150° C. for about 1 hour and was then dried at 160° C. by a rotary drier. The properties of the obtained dry PPS are shown in Table 1.

EXAMPLES 5 and 8

The procedures of Example 2 were repeated in the same manner except the heating time was changed to 30 minutes or 10 minutes. The results are shown Table 1.

EXAMPLES 7 through 9

The procedures of Example 3 were repeated in the same manner except that the heating time was changed to 2 hours, 3 hours or 6 hours. The results are shown in Table 1.

EXAMPLE 10

The procedures of Example 2 were repeated in the same manner except that 200 g of hydrous DMSO (comprising 90% of DMSO and 10% of deionized water) was used instead of 200 g of DMSO used in Example 2. The results are shown in Table 1.

EXAMPLE 11

The procedures of Example 2 were repeated in the same manner except that 200 g of hydrous DMSO (comprising 95% of DMSO and 5% of deionized water) was used instead of 200 g of DMSO used in Example 2 and the treatment was carried out at 143° C. under atmospheric pressure for 2 hours. The results are shown in Table 1.

EXAMPLES 12 and 13

The procedures of Example 3 were repeated in the same manner except that the PPS concentration in the slurry was changed to 20% or 30%. The results are shown in Table 1.

EXAMPLE 14

The procedures of Example 3 were repeated in the same manner except that instead of washing with acetone and water after the high-temperature treatment, washing with 100 ml of water at 100° C. was conducted 4 times. The results are shown in Table 1.

EXAMPLE 15

The procedures of Example 14 were repeated in the same manner except that instead of washing with water at 100° C., conducted 4 times, washing with 100 ml of water at 100° C. was conducted 3 times and washing with 100 ml of acetone at 60° C. was conducted once. The results are shown in Table 1.

EXAMPLE 16

The filter cake having a volatile component content of about 50% obtained after the high-temperature treatment in Example 3 was placed under a reduced pressure to recover DMSO and reduce the volatile component content to 3.0%. The cake was washed with 100 ml of water at 100° C. three times and with 100 ml of acetone at 60° C. once and was then dried. The results are shown in Table 1.

EXAMPLE 17

The procedures of Example 16 were repeated in the same manner except that instead of washing with 100 ml of water at 100° C., conducted 3 times, and washing with 100 ml of acetone at 60° C., conducted once, washing with 100 ml of water at 100° C. was conducted 4 times. The results are shown in Table 1.

EXAMPLE 18

Polyethylene glycol as a hydrophilic property-imparting agent was added to the filter cake having a volatile component content of about 50% obtained after the high-temperature treatment in Example 3, in an amount of 10% by weight based on the PPS solids. DMSO was recovered under a reduced pressure to reduce the volatile component content to 5.1%. The cake was washed with 100 ml of water at 100° C. four times and was then dried. The results are shown in Table 1.

EXAMPLE 19

The procedures of Example 18 were repeated in the same manner except that instead of washing with water at 100° C., conducted 4 times, washing with 100 ml of water at 100° C. was conducted three times and washing with 100 ml of acetone at 60° C. was conducted once. The results are shown in Table 1.

EXAMPLE 20

The procedures of Example 3 were repeated in the same manner except that PPS (100 mesh fraction=67%, 100–200 mesh fraction=33%, melting point=285° C., melt viscosity=1,320 poise, $Na_2O$ content=1,800 ppm) obtained by reacting p-dichlorobenzene with sodium sulfide in the presence of disodium phthalate as a co-catalyst (0.5 mole per mole of p-dichlorobenzene) according to the known method was used instead of the PPS used in Example b 3. The results are shown in Table 1.

TABLE 1

| Example No. | Treatment Conditions | | | Properties of PPS | | |
|---|---|---|---|---|---|---|
| | PPS Concentration (%) in Slurry | Temperature (°C.) | Time | Ash content (%) | $Na_2O$ Concentration (ppm) | Melt viscosity (poise) |
| 1 | 9 | 160 | 4 hours | 0.16 | 12.9 | 540 |
| 2 | 9 | 180 | 4 hours | 0.13 | 4.2 | 560 |
| 3 | 9 | 200 | 4 hours | 0.12 | 3.8 | 470 |
| 4 | 9 | 220 | 4 hours | 0.08 | 2.5 | 370 |
| 5 | 9 | 180 | 30 minutes | 0.11 | 5.8 | 520 |
| 6 | 9 | 180 | 10 minutes | 0.13 | 7.2 | 515 |
| 7 | 9 | 200 | 2 hours | 0.15 | 6.5 | 420 |
| 8 | 9 | 200 | 3 hours | 0.13 | 6.2 | 440 |
| 9 | 9 | 200 | 6 hours | 0.09 | 6.7 | 440 |
| 10 | 9 | 180 | 4 hours | 0.04 | 8.5 | 430 |
| 11 | 9 | 143 | 2 hours | 0.05 | 17.4 | 420 |
| 12 | 20 | 200 | 4 hours | 0.09 | 32.1 | 590 |
| 13 | 30 | 200 | 4 hours | 0.14 | 173 | 580 |
| 14 | 9 | 200 | 4 hours | 0.12 | 7.8 | — |
| 15 | 9 | 200 | 4 hours | — | 5.8 | 548 |
| 16 | 9 | 200 | 4 hours | — | 24.9 | 496 |
| 17 | 9 | 200 | 4 hours | — | 48.1 | 449 |
| 18 | 9 | 200 | 4 hours | — | 17.6 | 360 |
| 19 | 9 | 200 | 4 hours | — | 7.4 | 510 |
| 20 | 9 | 200 | 4 hours | 0.07 | 23.2 | 1,450 |

Note
$Na_2O$ concentration: determined by flame photometry
Melt viscosity: determined at 300° C.

The following PPS's were used in the subsequent examples.

PPS-I:
A powdery polymer obtained by reacting p-dichlorobenzene with sodium sulfide according to the known method, which had a melting point of 286° C., a melt viscosity of 52 poise as determined at 300° C., and a particle size of 10 to 150 μm (average particle size 35 μm).

PPS-II:
A powdery polymer obtained in a manner similar to that by which PPS-I was obtained, which had a melting point of 284° C., a melt viscosity of 63 poise as determined at 300° C., and a particle size of 10 to 170 μm (average particle size 40 μm).

PPS-III:
A powdery polymer obtained in a manner similar to that by which PPS-I was obtained, which had a melting point of 288° C., a melt viscosity of 112 poise as determined at 300° C., and a particle size of 5 to 130 μm (average particle size 32 μm).

PPS-IV:
Commercially available PPS (Ryton V-1 supplied by Phillips Petroleum).

EXAMPLE 21

A 1-liter autoclave was charged with 20 g of PPS-III and 200 g of 3% water-added sulfolane (L/N 8159124 supplied by Shin-Nippon Rika), and the mixture was treated at 190° C. with stirring for 4 hours. The mixture was cooled to 60° C. and filtered at 60° C. The filter cake was washed with 100 ml of methyl ethyl ketone (MEK) two times and with 100 ml of deionized water two times and was then dried at 90° C. under vacuum of 5 Torr. Drying was carried out under the same conditions in the subsequent examples.

EXAMPLE 22

In the same manner as described in Example 1, 20 g of PPS-I and 200 g of glycerol were treated. The reaction mixture was cooled to 60° C. and filtered at 60° C. The filter cake was washed with 100 ml of distilled water two times and then dried.

EXAMPLE 23

In the same manner as described in Example 22, 20 g of PPS-IV and 200 g of glycerol were treated, and the filter cake was washed with 100 ml of MEK once and with 100 ml of distilled water once and then dried.

EXAMPLE 24

In the same manner as described in Example 1, 20 g of PPS-I and 200 g of ethylene glycol were treated, and the reaction mixture was cooled to normal temperature. The filter cake was washed with 100 ml of MEK once and with 100 ml of deionized water two times and then dried.

EXAMPLE 25

In the same manner as described in Example 24, 20 g of PPS-I and 200 g of diethylene glycol were treated. The filter cake was washed with 100 ml of MEK two times and with 100 ml of deionized water two times and then dried.

EXAMPLE 26

A 1-liter autoclave was charged with 20 g of PPS-II, 100 g of sulfolane and 100 g of glycerol and the mixture was treated at 210° C. with stirring for 4 hours. The reaction mixture was filtered at 60° C. and the solvent-containing filter cake was washed with 100 ml of methanol two times and with 100 ml of deionized water once and then dried.

EXAMPLE 27

A 1-liter autoclave was charged with 20 g of PPS-1, 100 g of glycerol and 100 g of α-chloronaphthalene, and the mixture was treated at 230° to 240° C. with stirring for 4 hours. The filter cake was washed with 100 ml of MEK two times and with 100 ml of distilled water once and then dried.

EXAMPLE 28

A 1-liter autoclave was charged with 30 g of PPS-I, 150 g of glycerol and 150 g of α-chloronaphthalene, and the mixture was treated at 230° C. with stirring for 4 hours. The reaction mixture was filtered at 80° C., and the filter cake was washed with 200 ml of MEK two times and with 200 ml of deionized water two times and then dried.

EXAMPLE 29

A 1-liter autoclave was charged with 17 g of salt-removed PPS-I obtained in Example 28, 85 g of glycerol and 85 g of α-chloronaphthalene, and the mixture was treated at 230° C. with stirring. The reaction mixture was filtered at 60° C., and the filter cake was washed with 100 ml of MEK two times and with 100 ml of deionized water two times and then dried.

EXAMPLE 30

A 1-liter autoclave was charged with 30 g of PPS-I which had been pulverized to a particle size smaller than 17 μm (the average particle size was 6 μm) by a dry-type laboratory jet mill, 150 g of glycerol and 150 g of α-chloronaphthalene, and the mixture was treated at 240° C. with stirring for 4 hours. The filter cake was washed with 150 ml of MEK two times and with 150 ml of deionized water two times and then dried.

Example 31

A 1-liter autoclave was charged with 20 g of PPS-II, 100 g of ethylene glycol and 100 g of α-bromonaphthalene, and the mixture was treated at 210° C. with stirring for 4 hours. The reaction mixture was filtered at 50° C., and the solvent-containing filter cake was washed with 150 ml of acetone two times and with 100 ml of deionized water two times and then dried.

EXAMPLE 32

In the same manner as described in Example 24, the treatment, washing and drying were carried out by using 20 g of PPS-I, 100 g of benzyl alcohol and 100 g of N-methyl-2-pyrrolidone (NMP).

EXAMPLE 33

In the same manner as described in Example 24, 20 g of PPS-I, 100 g of glycerol and 100 g of NMP were treated, and the filter cake washed with 100 ml of MEK two times and with 100 ml of deionized water two times and then dried.

EXAMPLE 34

A paste was prepared by preliminarily mixing 200 g of PPS-III with 300 g of glycerol and dispersing and pulverizing the mixture by a roll mill comprising three rolls having a diameter of 6 inches. In the same manner as described in Example 24, 212.9 g of this paste (comprising 85.2 g of PPS-III and 127.7 g of glycerol) and 127.7 g of NMP were treated, and the filter cake was washed with 300 ml of distilled water two times and then dried.

EXAMPLE 35

In the same manner as described in Example 24, the treatment, washing and drying were carried out by using 20 g of pulverized PPS-I used in Example 30, 100 g of glycerol and 100 g of NMP.

A 1-liter autoclave was charged with 20 g of PPS-I, 66.7 g of glycerol, 66.7 g of α-chloronaphthalene and 66.7 g of NMP, and the mixture was treated at 230° C. with stirring for 4 hours. The filter cake was washed with 100 ml of MEK two times and with 100 ml of deionized water once and then dried.

EXAMPLE 37

A 1-liter autoclave was charged with 20 g of PPS-II, 50 g of sulfolane, 50 g of benzyl alcohol and 100 g of NMP, and the mixture was treated in the same manner as described in Example 24. The solvent-containing filter cake was washed with 100 ml of methanol two times and with 100 ml of deionized water two times and then dried.

EXAMPLE 38

A 1-liter autoclave was charged with 20 g of PPS-I, 66.7 g of glycerol, 66.7 g of biphenyl and 66.7 g of NMP, and the mixture was treated at 230° C. with stirring for 4 hours. The reaction mixture was cooled, and 100 g of xylene was added and the mixture was filtered. The filter cake was washed with 200 ml of xylene two times and with 200 ml of deionized water two times and then dried.

EXAMPLE 39

In the same manner as described in Example 24, the treatment was carried out by using 50 g of the PPS-III paste prepared in Example 34 (comprising 20 g of PPS-III and 30 g of glycerol), 70 g of glycerol and 100 g of NMP. The filter cake was washed with 100 ml of MEK once and with 100 ml of distilled water once and then dried.

EXAMPLE 40

A 1-liter autoclave was charged with 20 g of PPS-I, 150 g of glycerol and 50 g of distilled water, and the treatment was carried out in the same manner as described in Example 24. The filter cake was washed with 100 ml of MEK two times and with 100 ml of distilled water two times and then dried.

EXAMPLE 41

A 1-liter autoclave was charged with 20 g of PPS-II, 100 g of NMP and 100 g of distilled water, and the mixture was treated at 160° C. with stirring for 4 hours. The filter cake was washed with 100 ml of MEK two times and then dried.

COMPARATIVE EXAMPLE 1

A 1-liter autoclave was charged with 20 g of PPS-I and 200 g of distilled water, and the mixture was treated at 190° C. with stirring for 4 hours. The filter cake was washed with 100 ml of distilled water two times and then dried.

The results of the analysis of PPS's used in Examples 21 through 41 and Comparative Example 1 and the products obtained in these EXAMPLES are shown in Table 2. For the analysis of NaCl, the preliminary treatment was carried out by the sulfuric acid ashing method and the determination was then carried out by the flame photometry, and the NaCl content was shown as the $Na_2O$ content. The ash content was determined according to the customary method by using a muffle furnace.

TABLE 2

|  | NaCl Content (ppm) as $Na_2O$ | Ash Content (%) | Salt-Removing Ratio (%) |
|---|---|---|---|
| PPS-I | 3,378 | 1.239 | — |
| PPS-II | 2,700 | 0.801 | — |
| PPS-III | 2,369 | 0.697 | — |
| PPS-IV | 4,390 | 0.87 | — |
| Example 21 | 71.0 | 0.049 | 97.00 |
| Example 22 | 649 | 0.230 | 80.79 |
| Example 23 | 287 | 0.249 | 93.46 |
| Example 24 | 441 | 0.117 | 86.94 |
| Example 25 | 638 | 0.251 | 81.11 |
| Example 26 | 174 | 0.078 | 93.56 |
| Example 27 | 152 | 0.080 | 95.50 |
| Example 28 | 81.4 | 0.093 | 97.59 |
| Example 29 | 0.9 | 0.070 | 98.89 |
| Example 30 | 11.2 | 0.111 | 99.53 |
| Example 31 | 12.9 | 0.122 | 95.22 |
| Example 32 | 354 | 0.220 | 89.52 |
| Example 33 | 440 | 0.142 | 86.97 |
| Example 34 | 228 | 0.122 | 93.25 |
| Example 35 | 107 | 0.051 | 95.48 |
| Example 36 | 413 | 0.108 | 87.77 |
| Example 37 | 58 | 0.081 | 97.85 |
| Example 38 | 495 | 0.115 | 85.35 |
| Example 39 | 136 | 0.053 | 94.26 |
| Example 40 | 630 | 0.196 | 81.35 |
| Example 41 | 530 | 0.236 | 84.31 |
| Comparative Example 1 | 1,440 | 0.497 | 57.37 |

INDUSTRIAL APPLICABILITY

According to the method of the present invention, impurities can be removed from PPS at an efficiency as high 80 to 98%. A product of PPS obtained according to the method of the present invention has a very reliable moisture resistance, and therefore, is very valuable as a sealing agent for general electronic parts, IC's and LSI's.

What is claimed is:

1. A method for removing impurities from a polyphenylene sulfide resin, which comprises heat-mixing a powdery polyphenylene sulfide resin with a solvent selected from the group consisting of:
   (I) at least one solvent selected from the group consisting of dimethylsulfoxide, sulfolane, glycerol, and a combination of ethylene glycol or diethylene glycol with dimethylsulfoxide, sulfolane or glycerol,
   (II) a mixed solvent of a solvent selected from the group consisting of dimethylsulfoxide, sulfolane, glyceral, thylene glycol and diethylene glycol with an α-halogenated aphthalene or biphenyl,
   (III) a mixed solvent of the mixed solvent (II) or at least one solvent selected from the group consisting of benzyl alcohol, sulfolane and glyceral with N-methyl-2-pyrrolidone and
   (IV) a mixed solvent of the solvent (I) or N-methyl-2-pyrrolidone with water to bring the powder and the solvent sufficiently in contact with each other in the partially dissolved state, cooling and filtering the mixture, and washing the filter cake with a solvent incapable of dissolving the polyphenylenesulfide resin therein.

2. A method for removing impurities according to claim 1, wherein the polyphenylene sulfide resin is finely divided by the dry method.

3. A method for removing impurities according to claim 1, wherein the polyphenylene sulfide resin is finely divided by the wet method.

4. A method for removing impurities according to claim 1, wherein the ratio by weight of the polyphenylene sulfide resin to the solvent is from about 1/1 to about 1/15.

5. A method for removing impurities according to claim 1, wherein the polyphenylene sulfide resin and the solvent are heated at 100° to 270° C. and the mixture is maintained at said temperature for 10 minutes to 10 hours.

6. A method for removing impurities according to claim 1, wherein the solvent incapable of dissolving the polyphenylene sulfide resin therein is selected from the group consisting of aromatic and aliphatic hydrocarbons, ketones, alcohols and water.

* * * * *